Patented May 14, 1929.

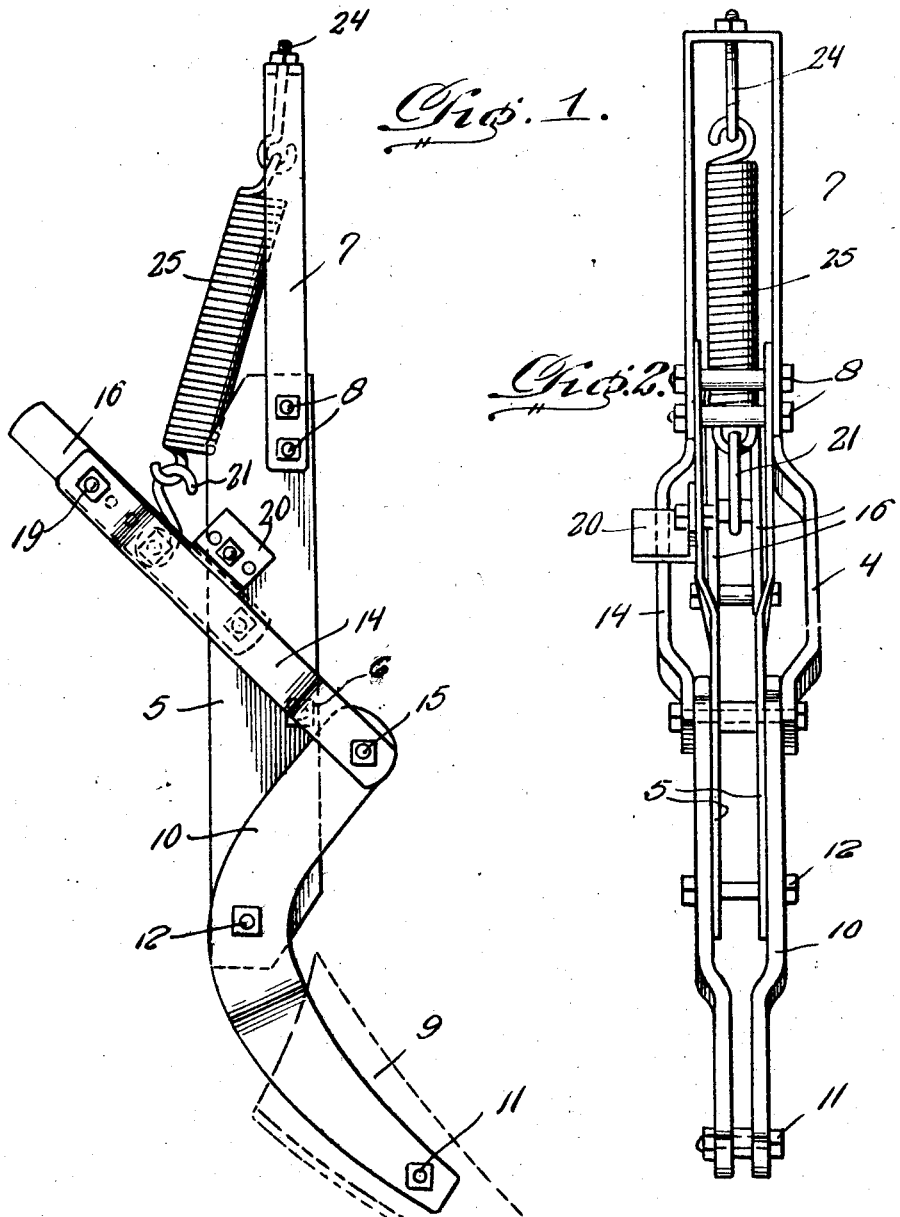

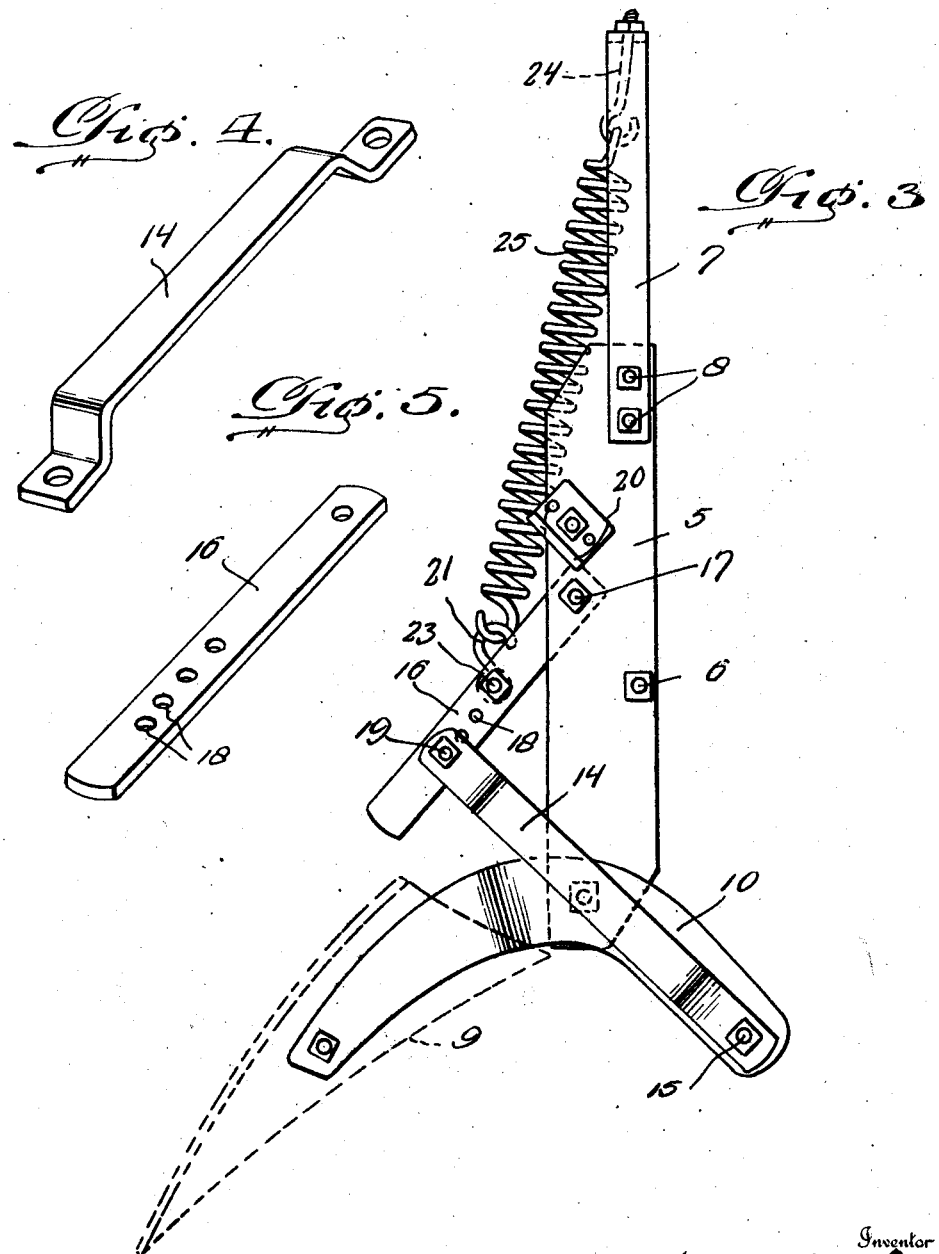

1,713,212

UNITED STATES PATENT OFFICE.

JACK BICKLEY, OF ROBSTOWN, TEXAS.

RELEASABLE IMPLEMENT.

Application filed February 24, 1928. Serial No. 256,654.

The present invention relates to a releasable implement supporting structure and has for its prime object to provide means of this nature which will enable the implement to give or move rearwardly and upwardly out of the way should it strike a rock or other obstruction which would tend to injure the implement or other associated parts.

Another very important object of the invention resides in the provision of a structure having the above indicated advantage which will further return to a normal operating position as soon as the obstruction has been passed.

A still further very important object of the invention resides in the provision of a releasable supporting structure of this nature which is simple, strong and durable, and fairly efficient and reliable in operation and use.

With the above and numerous other objects in view as will appear as the description proceeds, the invention resides in certain novel features of construction, and in the combination and arrangement of parts as will be hereinafter more fully described and claimed.

In the drawing:

Figure 1 is a side elevation of the structure in a normal operating position.

Figure 2 is a front elevation thereof,

Figure 3 is another side elevation thereof showing the parts moved to a position so that the implement may pass over an obstacle, Figure 4 is a detail perspective view of one of the links, and Figure 5 is a detail perspective view of one of the levers.

Referring to the drawings in detail it will be seen that the standard of the releasable implement is in the present instance formed of two plates 5 held in spaced parallelism by suitable means such as bolts 6 and by an inverted U-shaped frame 7 having its extremities fixed to the plate by bolts 8 so as to rise from the upper ends thereof. The numeral 9 denotes a digging, cultivating or plowing implement of any suitable formation and construction which is mounted on a beam, said beam in the present instance comprising a pair of longitudinally curved levers 10 of the first order having their lower extremities suitably fixed as at 11 to the implement 9 their intermediate portions pivoted as at 12 to the lower ends of the plates 5 to the outer sides thereof. A pair of links 14 have offset ends. One link has one of its offset ends pivotally connected with one of the upper ends of the levers 10 as at 15. A pair of levers 16 of the third order are pivoted at their ends to intermediate portions of the plates 5 as at 17 to be disposed between said plates. Adjacent the other ends of these levers 16 there are formed series of openings 18 for receiving bolts 19 for pivotally engaging the other offset ends of the links 14 with the levers 16. These series of openings 18, obviously, provide adjustable pivot connections between the links 14 and the levers 16. A stop bracket 20 is riveted or otherwise securely engaged on one of the plates 5 above the pivot 17 so that when the links 14 extend over the lever 16 so that said levers and said links incline upwardly and rearwardly as disclosed in Figure 1 the pivot 17 is slightly above lines drawn through pivot connections 19 and 15. A hook 21 is mounted between the levers 16 as at 23 between pivot 17 and the innermost openings 18. A hook post 24 is engaged with the bight of the frame 7 to depend downwardly therefrom. A spring 25 is engaged with the hook 24 and the hook 21 and to normally hold the parts in position shown in Figure 1.

From the above detailed description it will be seen that with the parts in the position shown in Figure 1 and moving forwardly which would be to the right of Figure 1, if the implement 9 abuts a rock or some other obstacle which might injure the apparatus in one way or the other, the implement 9 will swing rearwardly and under the pivot 12 to the position shown in Figure 3 so as to pass over the rock or other obstacle and the links 14 will then partially overlap the levers 10, the pivot 12 being slightly below a line between pivots 15 and 19 so that as soon as the implement has passed over the rock or obstacle the spring 25 will swing the lever 16 upwardly to return the parts to the position shown in Figure 1 ready for further normal operation. Because of the relationship of the parts, the structure will break only when an irresistible (from a practical standpoint) obstacle is encountered. The bracket 20 is abutted by one of the links 14 to limit the upward movement of the levers 16 by the spring 25 but it will be seen that when the implement 9 meets the obstacle that considerable leverage must be overcome before the mechanism will break thus preventing it from breaking when the implement meets such obstacles as it should be able to overcome without doing harm to the apparatus.

It is throught that the construction, operation, and advantages of the invention will now be quite apparent to those skilled in this art without a more detailed description thereof.

It is desired, however, to point out that the present apparatus was designed in its specific details as illustrated for use in connection with the beam of a middle buster plow so that when the plow shaft point strikes stumps, rocks or other difficult objects to move, it will trip and raise above the object and thus prevent breakage.

The present embodiment of the invention, however, has been disclosed in considerable detail merely by way of example since in actual practice it attains the features of advantage enumerated as desirable in the statement of the invention and the above description.

It is apparent that changes in the details of construction and in the combination and arrangement of parts may be resorted to without departing from the spirit or scope of the invention as hereinafter claimed or sacrificing any of its advantages.

Having thus described my invention, what I claim as new is:

1. A ground working implement supporting structure comprising, in combination with an implement, a pair of upright spaced parallel plates, a pair of levers pivoted intermediate their ends to the outer sides of the lower portions of the plate and supporting between adjacent ends the implement, a pair of links pivotally engaged with the other ends of the levers for movement to the outer sides of the plate, a second pair of levers pivoted at their adjacent ends to the inner sides of the plates above the first pivot, said links being pivotally engaged with the second levers remote from the second pivot, a spring tending to swing the second levers upwardly, and a stop bracket on the outer side of one of the plates with which the adjacent link is abuttable to prevent the links from moving to and above positions alined with the pivots of the second mentioned levers.

2. A ground working implement supporting structure comprising, in combination with an implement, a pair of upright spaced parallel plates, a pair of levers pivoted intermediate their ends to the outer sides of the lower portions of the plate and supporting between adjacent ends the implement, a pair of links pivotally engaging with the other ends of the levers for movement to the outer sides of the plate, a second pair of levers pivoted at their adjacent ends to the inner sides of the plates above the first pivot, said links being pivotally engaged with the second levers remote from the second pivot, a spring tending to swing the second levers upwardly, and a stop bracket on the outer side of one of the plates with which the adjacent link is abuttable to prevent the links from moving to and above positions alined with the pivots of the second mentioned levers, an inverted U-shaped frame having its extremities secured to the upper portions of the plates, and means securing the spring to the bight of the frame.

3. A ground working implement supporting structure comprising, in combination with an implement, a pair of upright spaced parallel plates, a pair of levers pivoted intermediate their ends to the lower portions of the plates and supporting between adjacent ends the implement, a pair of links having offset ends pivotally engaged with the other ends of the levers, said levers and said links being to the outer side of the plate, a second pair of levers pivoted at adjacent ends between the plates about the first pivot, said links having other offset ends pivotally engaged with the second levers, a hook mounted between the second levers and between their pivots, an inverted U-shaped frame having its extremity fixed to the upper portions of the plate to rise therefrom, a spring engaged with the bight of the frame and with the hook to normally tend to swing the second mentioned levers upwardly, and a bracket projecting outwardly from the outer side of one of the plates with which the link is abuttable to prevent the links from moving to and above positions alined with the pivot of the second mentioned levers.

In testimony whereof I affix my signature.

JACK BICKLEY.